US00RE40502E

(19) United States
(12) Reissued Patent
Kunii et al.

(10) Patent Number: US RE40,502 E
(45) Date of Reissued Patent: Sep. 16, 2008

(54) PLASMA DISPLAY PANEL AND METHOD FOR MANUFACTURING THE SAME

(75) Inventors: Yasuhiko Kunii, Miyazaki (JP); Masayuki Shibata, Miyazaki (JP); Yoshimi Kawanami, Miyazaki (JP); Kenichi Yamamoto, Miyazaki (JP); Atsushi Yokoyama, Miyazaki (JP); Yusuke Yajima, Miyazaki (JP); Shinji Kanagu, Miyazaki (JP); Yasuhiro Wakabayashi, Miyazaki (JP); Akihiro Fujimoto, Miyazaki (JP); Toshiyuki Nanto, Miyazaki (JP)

(73) Assignee: Fujitsu Hitachi Plasma Display Limited, Kawasaki (JP)

(21) Appl. No.: 11/113,337
(22) Filed: Apr. 25, 2005

Related U.S. Patent Documents

Reissue of:
(64) Patent No.: 6,608,441
Issued: Aug. 19, 2003
Appl. No.: 09/778,879
Filed: Feb. 8, 2001

(30) Foreign Application Priority Data

Sep. 6, 2000 (JP) ..... 2000-269569

(51) Int. Cl.
*H01J 17/49* (2006.01)

(52) U.S. Cl. ..... 313/584; 313/585; 313/586
(58) Field of Classification Search ..... 313/584, 313/582, 493, 586, 587, 585; 445/25, 46; 345/60
See application file for complete search history.

(56) References Cited

U.S. PATENT DOCUMENTS

| | | | | |
|---|---|---|---|---|
| 3,953,756 | A | 4/1976 | Monfroy et al. | 313/586 |
| 5,352,478 | A | 10/1994 | Miyake et al. | 427/68 |
| 5,754,003 | A | 5/1998 | Murai et al. | 313/634 |
| 5,909,083 | A | 6/1999 | Asano et al. | 313/584 |
| 5,990,616 | A | 11/1999 | Lee et al. | 313/582 |
| 6,249,264 | B1 | 6/2001 | Sano et al. | 345/60 |
| 6,313,580 | B1 | 11/2001 | Makino | 313/582 |

FOREIGN PATENT DOCUMENTS

| | | |
|---|---|---|
| EP | 0 920 048 | 6/1999 |
| JP | 4-206126 | 7/1992 |
| JP | 4-274141 | * 9/1992 |
| JP | 4-277439 | 10/1992 |
| JP | 5-094772 | 4/1993 |
| JP | 9-115452 | 5/1997 |
| JP | 9-190768 | 7/1997 |
| JP | 11-213896 | 8/1999 |
| JP | 11-297211 | 10/1999 |

OTHER PUBLICATIONS

Korean Intellectual Property Official Communication dated Oct. 25, 2006.
European Search Report, dated Sep. 8, 2004, and issued in corresponding European Patent Application No. 01301155.6–2208, (3 pages).

* cited by examiner

*Primary Examiner*—Bao Q Truong
(74) *Attorney, Agent, or Firm*—Staas & Halsey LLP

(57) ABSTRACT

[A plasma display panel has a good productivity of partition formation and air exhaustion process and realizes a bright and stable display. A discharge gas is filled in a gap between two substrates. A mesh-patterned partition is arranged on the inner surface of one of the substrates for dividing the gap into plural squares corresponding to a cell arrangement. The partition has low portions forming a mesh-like air path that travels through all of the gas-filled space enclosed by the partition, in a plan view.] *A plasma display panel includes two spaced substrates defining a gap therebetween. The gap is divided by intersecting walls into columns and rows of discharge cells. Portions of a wall that are lower in height than remaining portions of the wall define a flow path. The plasma display panel realizes a bright and stable display.*

37 Claims, 11 Drawing Sheets

PLASMA DISPLAY PANEL AND METHOD FOR MANUFACTURING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a plasma display panel (PDP) having a mesh-patterned partition, each square of which encloses one or more cells for constituting a display surface and a method for manufacturing the PDP.

A PDP is commercialized for a wall-hung TV set, whose screen size has reached 60 inches. PDP is a digital display device comprising binary light emission cells, so it is suitable for a display of digital data and is expected as a multimedia monitor. In order to increase applications of a PDP, a new panel structure is under development, which can provide a brighter and more stable display and can be manufactured in a high productivity.

2. Description of the Prior Art

An AC type PDP for a color display employs a surface discharge format. The surface discharge format has an arrangement of electrodes in which display electrodes that become anodes and cathodes in a display discharge for ensuring a luminance are arranged in parallel on a front or back substrate, and address electrodes are arranged so as to cross a pair of the display electrodes. In the surface discharge format PDP, a partition is necessary for separating a discharge for each column of a matrix display along the longitudinal direction of the display electrode (hereinafter referred to as the row direction). The partition also works as a spacer for defining a discharge space size in the direction of the panel thickness.

A partition pattern (a shape of the partition in the plan view) is broadly divided into a stripe pattern and a mesh pattern. The stripe pattern divides the discharge space for cells arranged in the row direction (i.e., in each column). In the stripe pattern, the discharge space of cell included in each column is not separated, so that exhausting of inner air and filling of discharge gas are relatively easy in a manufacturing process of a PDP. The mesh pattern divides the discharge space both in the row direction and in the column direction. A typical mesh pattern is a check pattern. A mesh pattern has an advantage in that the discharge is separated for each cell and that a fluorescent material is arranged on a side face of the partition so as to enclose the cell for increasing a light emission area. The mesh pattern, however, has a disadvantage in that a gap generated by subtle unevenness on the upper surface of the partition becomes an air path in the inner air exhaustion, so a resistance of the air exhaustion is large and it takes a long time for the process.

Conventionally, a partition structure of an overlaying form of the mesh-patterned partition and the stripe-patterned partition (this is called a composite pattern structure) is known. In this structure, since the discharge space is continuous as in the case of the stripe pattern, the air exhaustion resistance is smaller than in the case where the stripe-patterned partition is not overlaid. Furthermore, an improved composite pattern structure is disclosed in Japanese unexamined patent publication No. 4-274141, in which a stripe-patterned partition is provided with a hiatus for each cell, so that a grid-shaped air path (air exhaustion path) is formed for the gas to flow not only in the column direction but also in the row direction.

The above-explained partition having the composite pattern structure has a mesh-patterned partition whose banding portion in the column direction or the row direction is raised. There was a problem that the partition forming process becomes complicated for forming the above-mentioned structure on the inner surface of one of the substrate pair. Furthermore, if a mesh-patterned partition is disposed at one of the substrates and if a stripe-patterned partition is disposed on the other partition, the fluorescent material should be arranged on both of the substrates for increasing the area in which the fluorescent material is formed. In addition, a registration of the substrate pair in the assembling process is difficult. Thus, the partition having the composite pattern structure is adverse from the viewpoint of the productivity.

There is a method of forming the air path by cutting a part of the partition. However, this method may increase the number of manufacturing steps for the cutting process and may reduce the manufacturing yield since the partition can be broken by the cutting process.

SUMMARY OF THE INVENTION

An object of the present invention is to provide a PDP that has a good productivity of partition formation and air exhaustion process and can display more brightly and more stably than a PDP that has a stripe-patterned partition.

According to the present invention, a mesh-patterned partition is arranged on the inner surface of one of the substrates. The partition has low portions that form a mesh-like air path that travels through all of the gas-filled space enclosed by the partition in a plan view. For example, in a simple check pattern in which a line along the horizontal direction and a line along the vertical direction cross each other, the portion corresponding to the line along the horizontal direction is made low. In this case, the pattern width (the line width) of the portion corresponding to the line along the horizontal direction is made thicker than the pattern width of the portion corresponding to the line along the vertical direction so as to generate a height difference. The shrink quantity in the thick portion is smaller in the width direction but is larger in the height direction than the thin portion.

DESCRIPTION OF THE PREFERRED EMBODIMENTS

Hereinafter, the present invention will be explained in detail with reference to embodiments and accompanied drawings.

Figure 1:
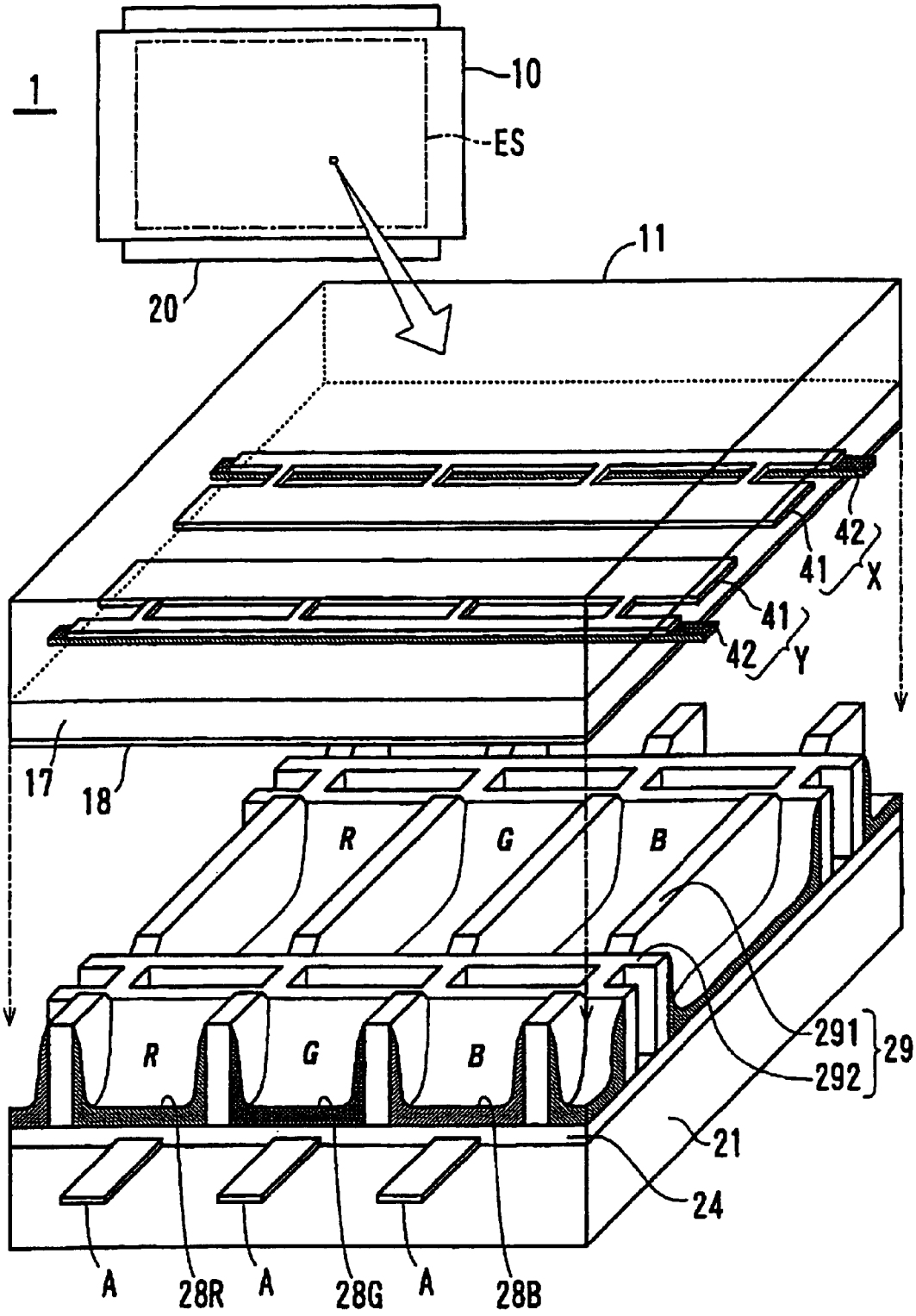
FIG. 1 is a diagram showing a cell structure of a PDP according to the present invention.
Figure 2:
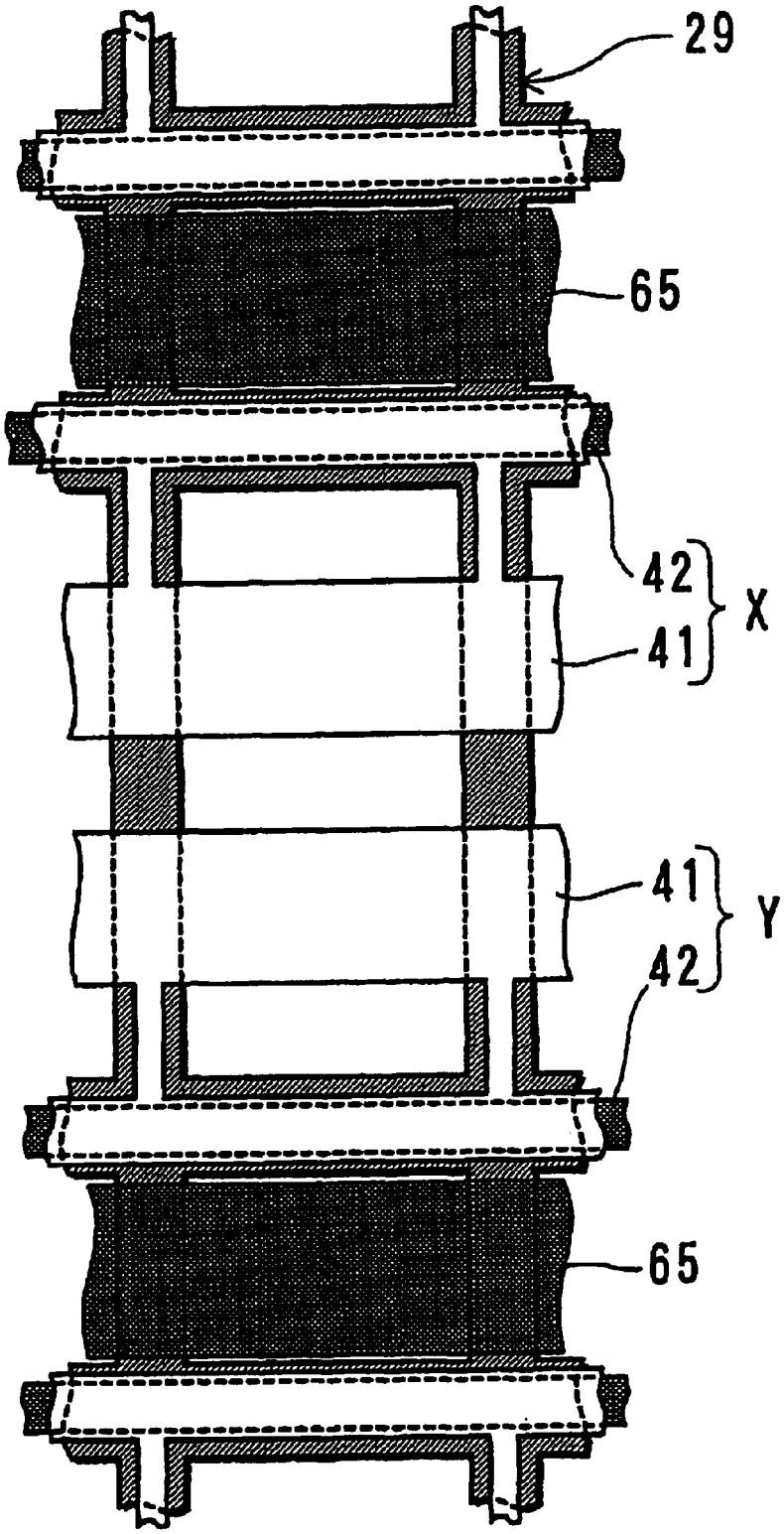
FIG. 2 is a plan view showing the arrangement relationship between the display electrode and the partition.

FIG. 1 is a diagram showing a cell structure of a PDP according to the present invention. FIG. 2 is a plan view showing the arrangement relationship between the display electrode and the partition. FIG. 1 is a drawing of an inner structure, which shows a pair of substrate structures being separated from each other.

The PDP 1 comprises a pair of substrate structures (a structure including a substrate on which cell elements are arranged) 10, 20, and the display surface ES comprises m×n cells. In each cell, the display electrodes X, Y constituting an electrode pair for generating the display discharge are extending in the row direction (the horizontal direction) of the matrix display, and the address electrodes A are extending in the column direction (the vertical direction).

The display electrodes X, Y are arranged on the inner surface of the glass substrate 11 of the front substrate structure 10 as a pair for each row. Herein, the "row" means a set of cells whose positions in the column direction are the same, and the number of the cells is equal to the number of columns (m). Each of the display electrodes X and Y includes a transparent conductive film 41 that forms a surface discharge gap (a discharge slit) and a metal film (a bus conductor) 42 that is overlaid on the edge in the column direction. The display electrodes X, Y are covered with a dielectric layer 17 having the thickness of approximately 20–40 μm, and the surface of the dielectric layer 17 is coated with a protection film 18 made of magnesia (MgO). The electrode gap between rows (that is called a reverse slit) is provided with a dark color layer 65 that is called a black stripe by applying a paint on the outer surface of the glass substrate 11 or by forming a colored glass layer including fillers such as manganese, iron oxide, chromium and other colorant so as to increase contrast (see FIG. 2).

The address electrodes A are arranged on the inner surface of the glass substrate 21 of the back substrate structure 20 as one for each column and are covered with a dielectric layer 24. On the dielectric layer 24, the partition 29 is disposed, which has a grid pattern with partially low profile structure that is unique to the present invention. The partition 29 is made of a baked material of a low melting point glass and includes a portion for dividing the discharge space into columns (hereinafter referred to as a vertical wall) 291 and a portion for dividing a discharge space into rows (hereinafter referred to as a horizontal wall) 292. The intersection of the vertical wall 291 and the horizontal wall 292 is a common part of them. The horizontal wall 292 is lower in height (i.e., is shorter) than the vertical wall 291 by approximately 10 μm. The upper surface of the dielectric layer 24 and the side face (i.e., side walls) of the partition 29 are covered with red, green and blue colors of fluorescent material layers 28R, 28G and 28B for color display. The italic letters (R, G and B) in FIG. 1 signify light emission colors of the fluorescent materials. The color arrangement has a repeating pattern of red, green and blue colors in such a way that the cells in a column have the same color. The fluorescent material layers 28R, 28G and 28B are excited by ultraviolet rays generated by the discharge gas in the corresponding cell and emit light.

As shown in FIG. 2, the metal film 42 of each of the display electrodes X, Y is overlaid on the partition 29 so as to cover the partition 29 partially, for reducing reflection of external light rays, and to avoid overlapping onto the fluorescent material on the partition sidewalls. The transparent conductive film 41 is patterned in such a way that the portion for the surface discharge is substantially separated from the portion overlaid on the metal film 42, for suppressing discharge current so as to enhance the efficiency of light emission. In the case of 42 inch wide VGA type, the portion for the display discharge of the transparent conductive film 41 is separated from the horizontal wall 292 by a distance more than 30 μm, so that energy loss is largely reduced compared with the case where the distance is less than 30 μm. It is desirable that the distance between the horizontal wall 292 and the transparent conductive film 41 is set so that the discharge current is reduced by more than 5%.

The PDP 1 having the above-mentioned structure can be manufactured by the following process.

(1) Providing the glass substrates 11, 21 with a predetermined element separately to make the substrate structures 10, 20.
(2) Overlaying the substrate structures 10, 20, and sealing the rim of the opposing area.
(3) Exhausting the inner air and filling the discharge gas through an air hole that is formed in the back substrate structure 20.
(4) Closing the air hole.

Figure 3:
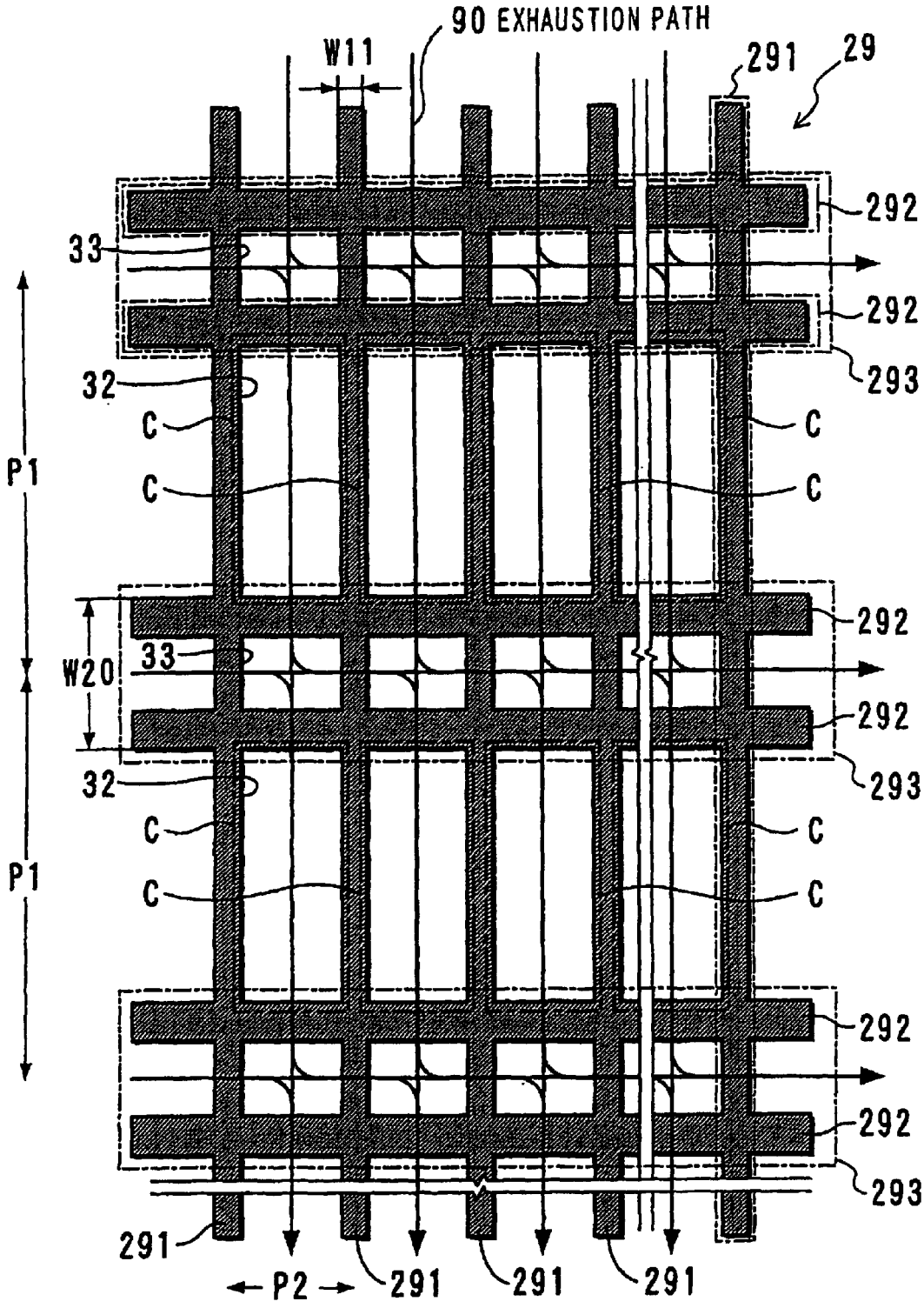
FIG. 3 is a plan view showing a partition pattern.
Figure 4:
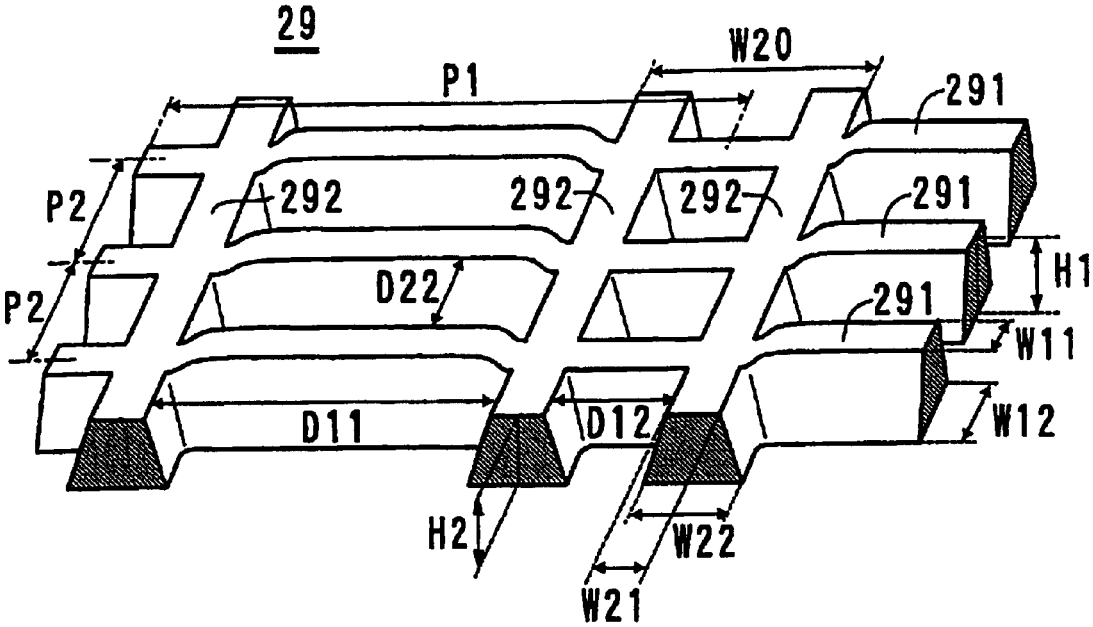
FIG. 4 is a diagram showing a solid structure of the partition.

FIG. 3 is a plan view showing a partition pattern. FIG. 4 is a diagram showing a solid structure of the partition.

As shown in FIG. 3, the partition pattern is a grid pattern in which each square of the grid pattern encloses a cell C individually. However, it is not a simple check pattern. Namely, the inter-row portion 293 (the portion between the cells aligned in the column direction) of the partition 29 includes two horizontal walls 292 and a part of the vertical wall 291. The plan view pattern of the inter-row portion 293 is made of a ladder pattern, and a space 33 is formed between the gas-filled space 32 that corresponds to each of the cells C aligned in the column direction. Since the dielectric constant of the discharge gas is approximately one eighth of that of a low melting point glass that is a common material of the partition, capacitance between the display electrodes of the neighboring rows is reduced, so that a waste of power consumption can be reduced and response of drive control can be improved. In the check pattern, the side face of the vertical wall 291 and the side face of the horizontal wall 292 respectively are provided with a fluorescent material, so that the light emission area is enlarged and the light emission efficiency can be improved.

Figure 5:
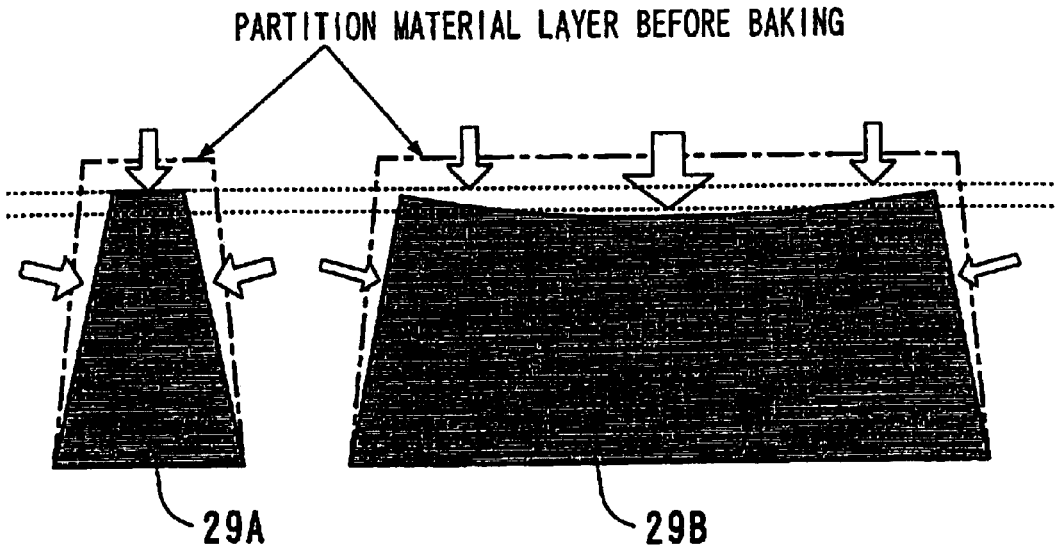
FIG. 5 is a schematic diagram showing heat shrink in the partition forming process.

In the PDP 1 of this embodiment, the inter-row portion 293 of the partition 29 is made approximately 10 μm lower than other portions, i.e., made approximately 7% lower, relative to the maximum height (140 μm) of the partition 29. Thereby, an air exhaustion path 90 is formed which has a grid shape in the plan view for enabling air exhaustion both in the column direction and in the row direction. The width W20 of the inter-row portion 293 is substantially large, and the inter-row portion 293 is substantially lowered, relative to the other portions, and therefor, the air exhaustion conductance is substantially the same as the stripe pattern. Concrete dimension of the partition 29 is as follows.

row pitch P1: 1080 μm
column pitch P2: 360 μm
width W11 of the upper surface of the vertical wall 291: approximately 70 μm
width W12 of the bottom surface of the vertical wall 291: approximately 140 μm
height H1 of the vertical wall 291: approximately 140 μm
width W21 of the upper surface of the horizontal wall 292: approximately 100 μm
width W22 of the bottom surface of the horizontal wall 292: approximately 200 μm
height H2 of the horizontal wall 292: approximately 130 μm
column direction size D11 of the space 32: approximately 680 μm row direction size D22 of the space 32: approximately 290 μm column direction size D12 of the space 33: approximately 200 μm width W20 of the inter-row portion 293: approximately 400 μm It is important that the width W20 of the inter-row portion 293 is substantially larger than the width W11 of the vertical wall 291, so that the difference between the widths makes a height difference between the inter-row portion 293 and other portions. Namely, in a baking process of a material such as a general low melting point glass having a heat shrink property, as shown schematically in FIG. 5, the shrink quantity in the height direction depends on the width of the pattern. The shrink can be generated both in the width direction and in the height direction as a whole in the portion 29A having a small pattern width. In contrast, in the portion 29B having a large pattern width, the shrink in the width direction is suppressed more at the portion closer to the center in width direction, so that the shrink is generated more in the height direction, compensating for the suppression in the width direction. Therefore, the thick portion 29B becomes lower in height than the thin portion 29A. In addition, an isotropic shrink occurs in the upper portion of the wall material layer since the shrink can easily occur in any direction, while the shrink in the direction of the substrate surface is suppressed in the bottom portion due to the bond of the substrate. Therefore, the shrink quantity in the height direction becomes larger than the shrink quantity in the direction of the substrate surface. Namely, even if the width of the upper surface is substantially uniform before baking, and if the widths of the bottom surface are different, the height after baking of the material layer having larger width of the bottom surface becomes lower than the material layer having smaller width of the bottom surface. Considering this fact, the pattern width of the partition is defined as the dimension at the position whose distance from the bottom surface is 10% of the height in this specification. It is desirable that the pattern width of the thick portion is set to be more than 130% of the pattern width of the thin portion so that a difference of height is generated that is sufficient for air exhaustion. In the case of the above-mentioned partition size, two horizontal walls 292 and the portion between them (a part of the vertical wall 291) are shrunk in the same way in the height direction, and a partition 29 is obtained that has two inter-row portions 293 having low profile as a whole in the inter-row portion 293 of the ladder pattern.

The composition of the low melting point glass that is a material of the partition 29 is shown in Table 1.

TABLE 1

Composition of the low melting point glass

| Components | Content (wt %) |
|---|---|
| PbO | 50-60 |
| $B_2O_3$ | 5-10 |
| $SiO_2$ | 10-20 |
| $Al_2O_3$ | 15-25 |
| CaO | −5 |

Concerning optical characteristics of the partition 29, it is desirable that it is semitransparent having the absorptance of visual light at approximately 80% per 30 μm of film thickness. If it is semitransparent, light rays generated at the vicinity of the top of the partition pass the partition and contribute to improvement of the luminance, while external rays that entered the partition are reflected by the bottom surface of the partition and are absorbed by the partition before reaching the front surface. Therefore, a display having a good contrast can be realized.

The process of forming the partition 29 is as follows.

(1) Forming the partition material layer having the thickness of approximately 200 μm made of a uniform paste mixture of a low melting point glass powder having the components shown in Table 1 and a vehicle so as to cover the dielectric layer 24. The partition material layer may be formed by any method such as a screen printing method, a laminating method in which a green sheet is transferred, or other method.

(2) Drying the partition material layer, and then sticking thereto a photosensitive dry film (or a resist material is applied), and forming a cut mask of the grid pattern corresponding to the partition 29 by using photolithography, including exposure and development. The mask pattern size is set larger that the desired partition size considering the heat shrink quantity.

(3) Grinding the non-masking portion of the partition material layer by a sandblaster until the dielectric layer 24 is exposed (the partition material layer is patterned).

Figure 6:
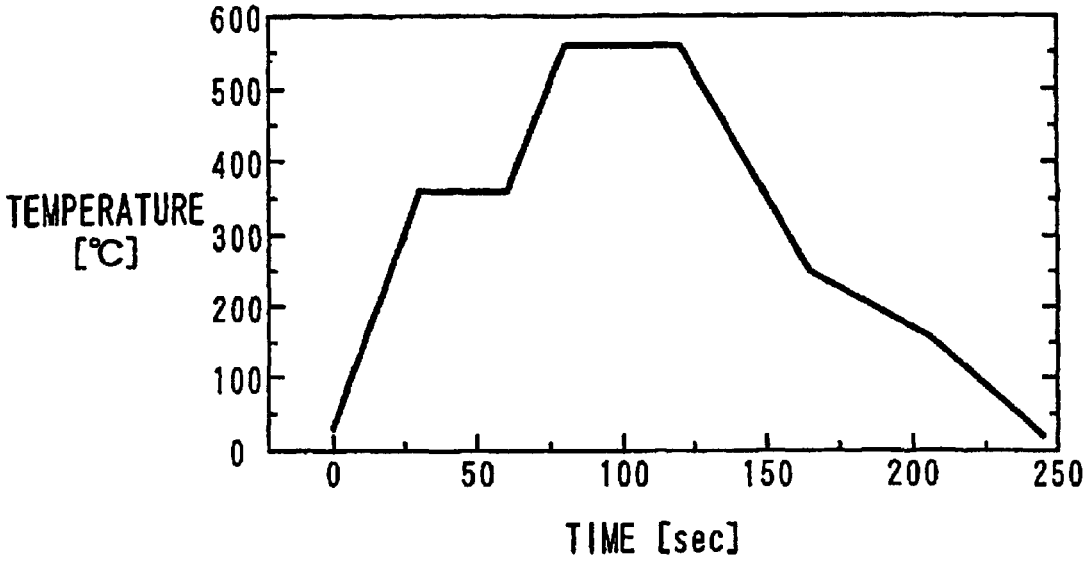
FIG. 6 is a diagram showing a baking profile in the partition forming process.

(4) Performing a heating process according to the baking profile shown in FIG. 6 to bake the partition material layer so that the partition 29 is formed.

Figure 7:
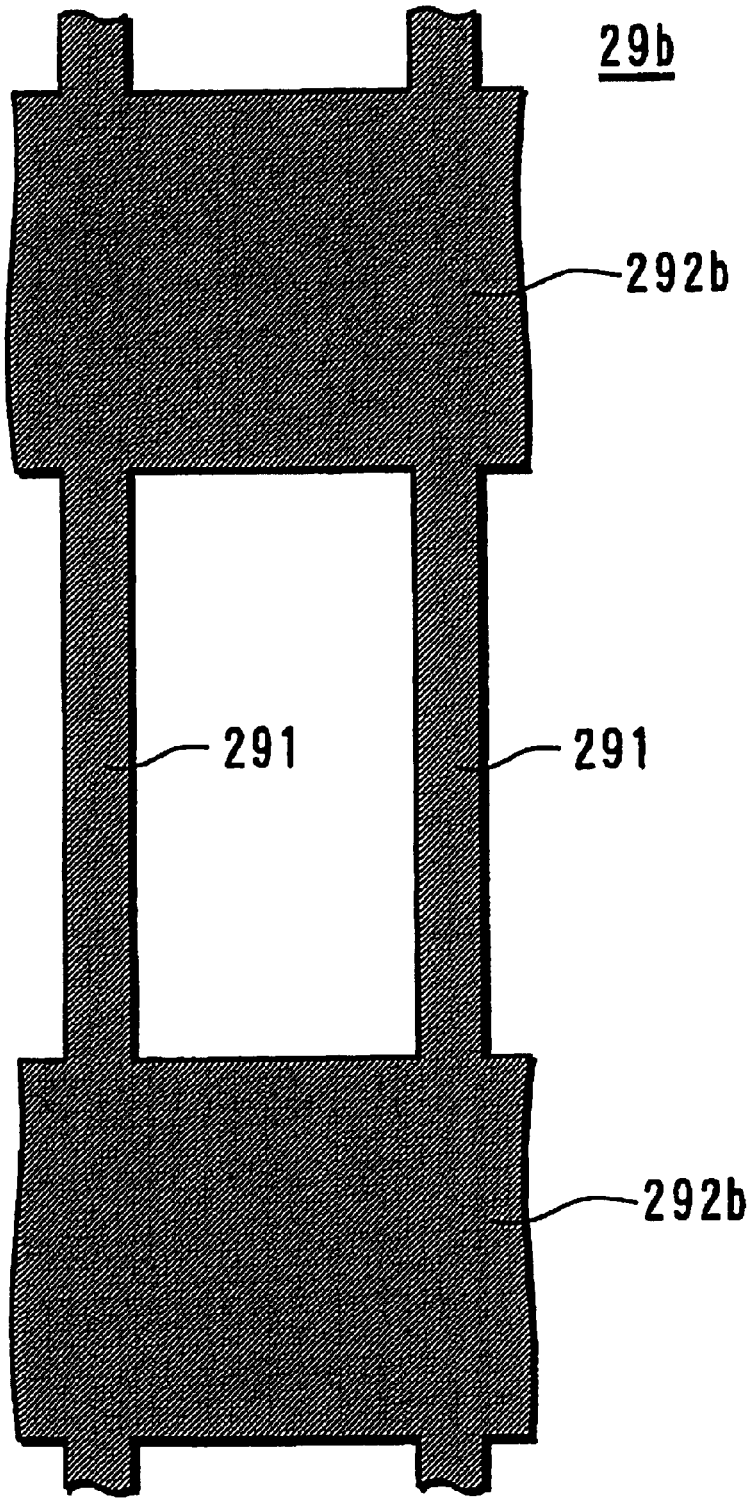
FIGS. 7, 8A and 8B show variations of the partition pattern.
Figure 8A:
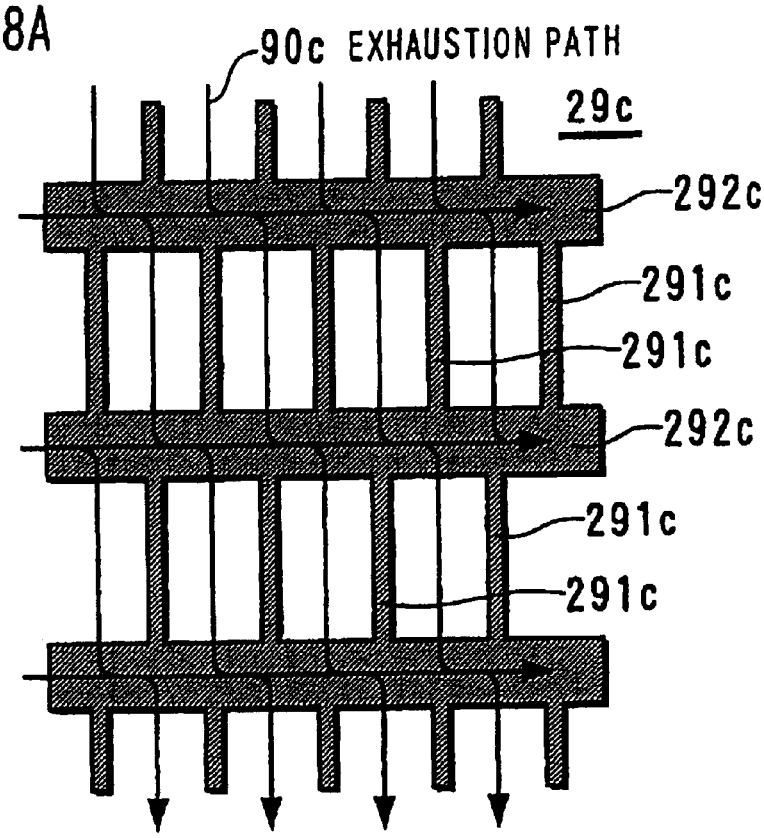
Figure 8B:
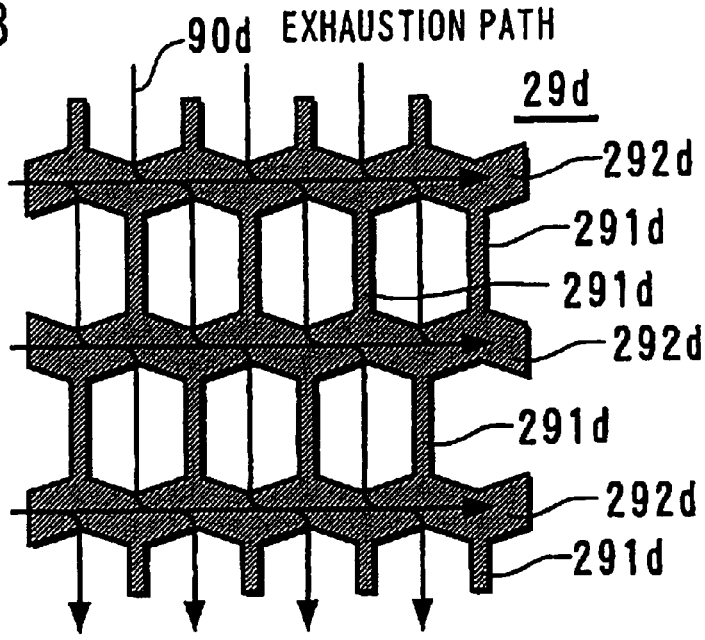

FIGS. 7, 8A and 8B show variations of the partition pattern.

The partition 29b shown in FIG. 7 includes a vertical wall 291 and a horizontal wall 292b. The partition 29b corresponds to such that the inter-row portion 293 of the partition 29 shown in FIG. 3 is replaced with the horizontal wall 292b. The partition 29c shown in FIG. 8A includes a vertical wall 291c and a horizontal wall 292c. The pattern thereof in a plan view is a mesh pattern in which the positions of cells of the neighboring rows are shifted by a half pitch from each other. In the partition 29c, the pattern width of the horizontal wall 292c is set larger than the pattern width of the vertical wall 291c, so that the horizontal wall 292c is lower than the vertical wall 291c, and a mesh-like air exhaustion path 90c is formed. The partition 29d shown in FIG. 8B includes a vertical wall 291d and a horizontal wall 292d, and the pattern thereof in a plan view is a honeycomb mesh pattern. In the partition 29d, too, the pattern width of the zigzag banding horizontal wall 292d is set larger than the pattern width of the vertical wall 291d, so that the horizontal wall 292d is lower than the vertical wall 291d, and a mesh-like air exhaustion path 90d is formed. In a PDP having the partitions 29c and 29d, the address electrodes A can be arranged so that the address electrode A weaves in and out of the cells shifted from each other by a half pitch, or that a linear address electrode A is arranged being overlaid on the vertical walls 291c and 291d. The display electrodes X, Y can be arranged so that a pair of display electrodes is arranged for each row as shown in FIG. 2, or that three display electrodes are arranged for two rows as a display electrode is shared by two neighboring rows for display. In any way, the entire bus conductor is overlaid on the horizontal walls 292c and 292d, so that shading can be avoided.

FIGS. 9A–12 show variations of the display electrode pattern.

Figure 9A:
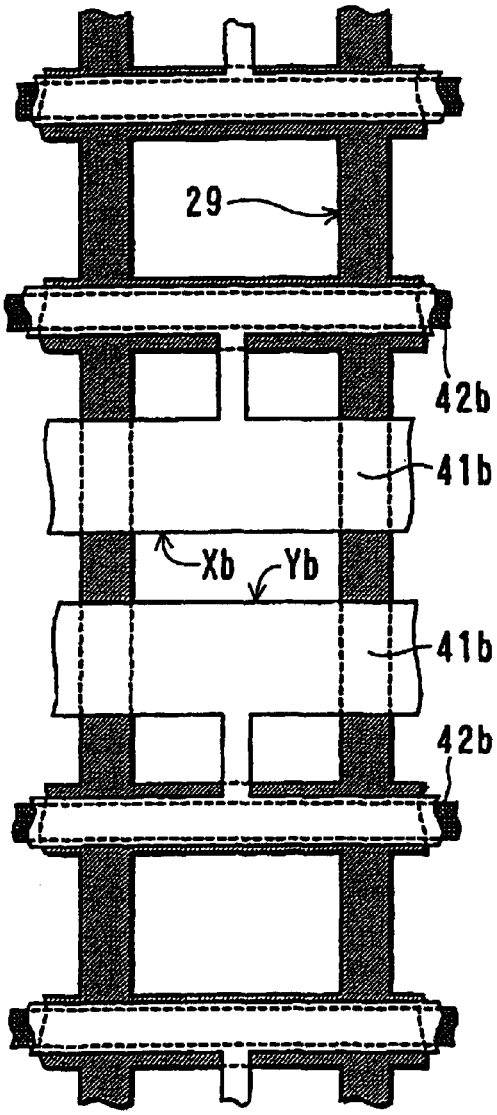
FIGS. 9A–12 show variations of the display electrode pattern.
Figure 9B:
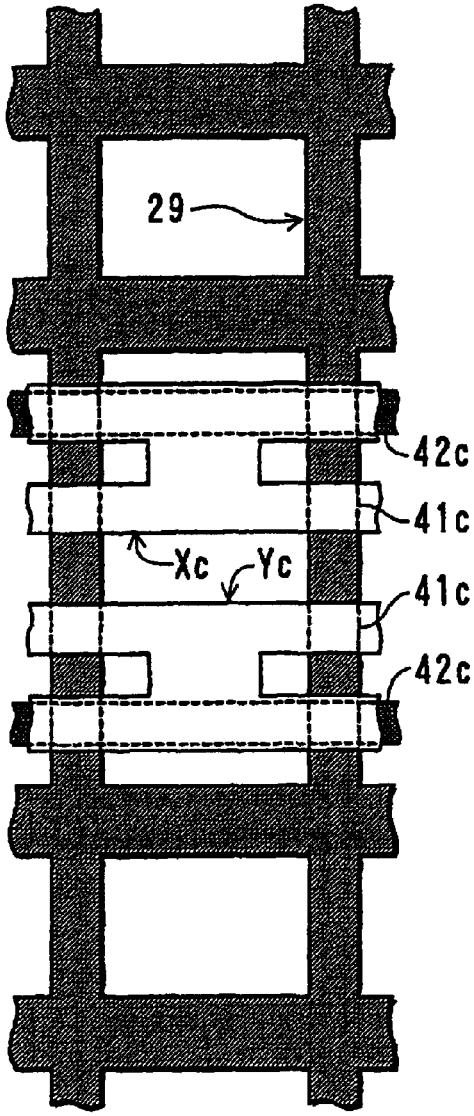
Figure 10A:
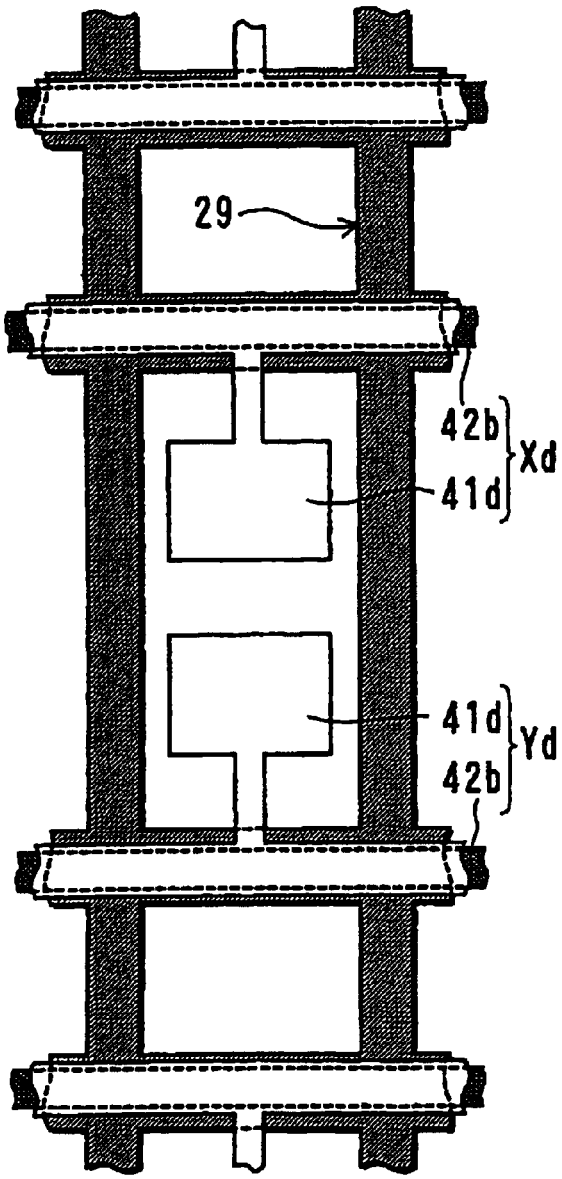
Figure 10B:
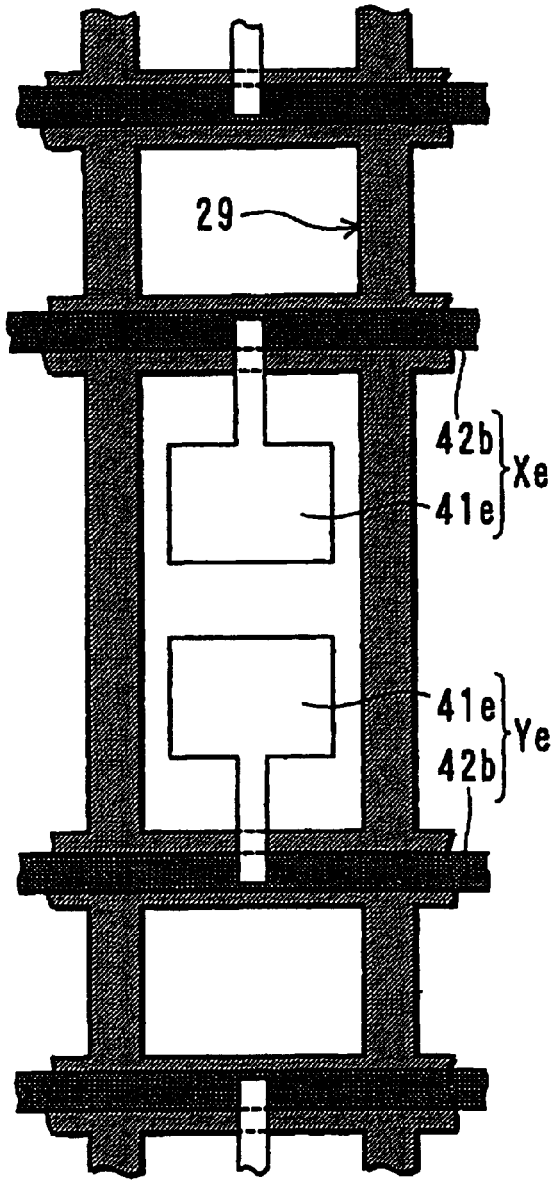

Each of the display electrodes Xb and Yb shown in FIG. 9A includes a transparent conductive film 41b and a metal film 42b and corresponds to such display electrodes wherein the pattern of the transparent conductive film 41 of the display electrodes X, Y shown in FIG. 2 is changed. In the display electrodes Xb and Yb, the portion of the transparent conductive film 41 to be a discharge surface is connected to the portion that is overlaid on the metal film 42b at the position where it is not overlaid on the vertical wall of the partition 29. Each of the display electrodes Xc and Yc shown in FIG. 9B includes a transparent conductive film 41c and a metal film 42c. The metal film 42c is arranged at the position where it is not overlaid on the horizontal wall of the partition 29. In the display electrodes Xd and Yd shown in FIG. 10A, the portion of the transparent conductive film 41d that forms the surface discharge gap to be the discharge surface is divided into columns to be a T-shape. The portion of the transparent conductive film 41d that is overlaid on the metal film 42b is straddling over plural columns. Each of the display electrodes Xe and Ye shown in FIG. 10B includes a T-shaped transparent conductive film 41e that is divided for each column and a metal film 42b for supplying electricity to the transparent conductive film. The structures of FIGS. 10A and 10B in which the transparent conductive film is divided are effective for suppressing a discharge current and for reducing a capacitance between electrodes.

Figure 11:
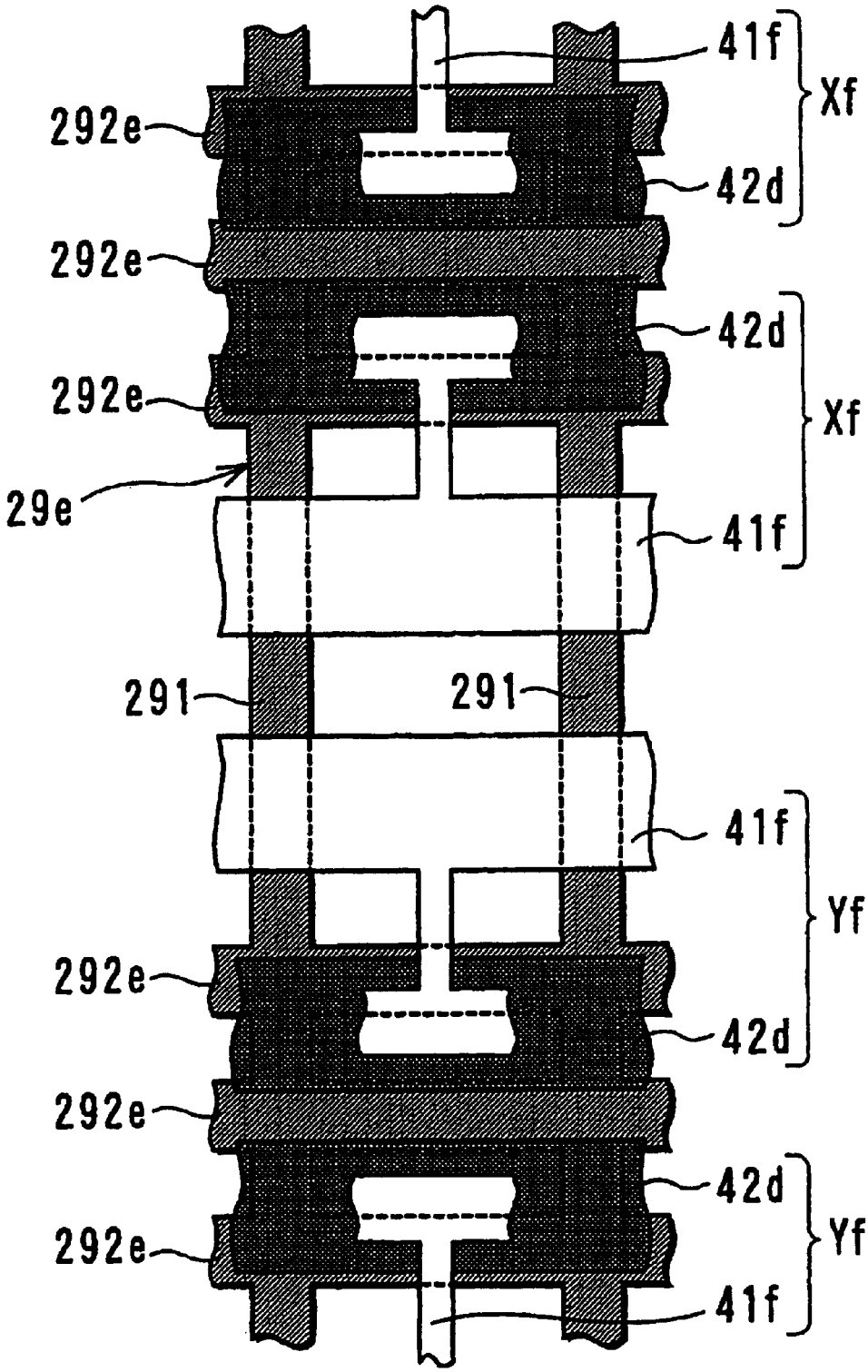
Figure 12:
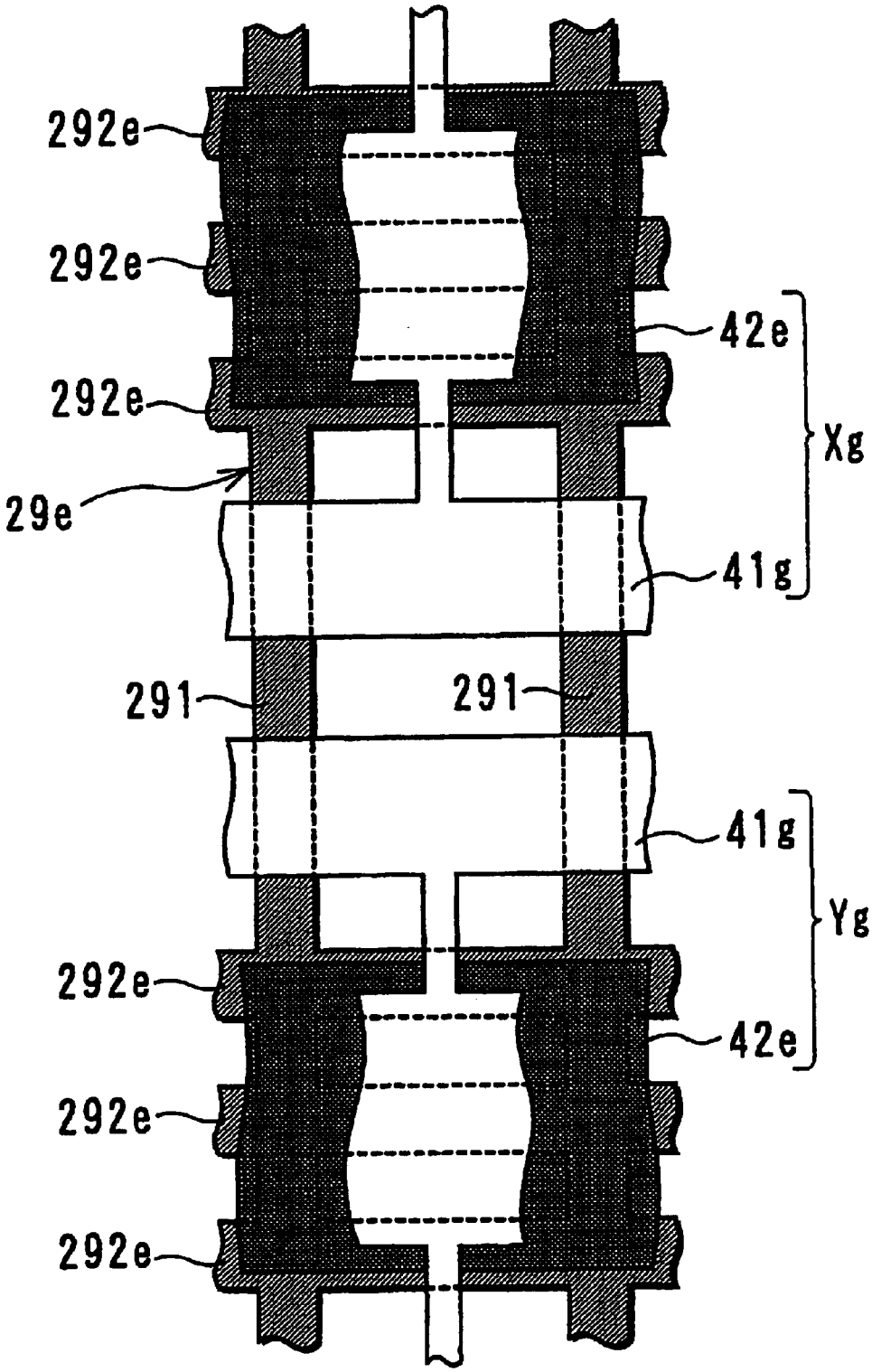

In the example shown in FIG. 11 and in the example shown in FIG. 12, a bus conductor is provided for hiding the reverse slit, so that the process of forming the black stripe can be omitted. In FIGS. 11 and 12, the partition 29e includes a vertical wall 291 and a horizontal wall 292e and corresponds to such partition wherein the inter-row portion 293 of the partition 29 shown in FIG. 3 is replaced with three horizontal walls 292e. However, the following electrode structure can be applied both to the partition 29 shown in FIG. 2 and to the partition 29b shown in FIG. 7.

In FIG. 11, each of the display electrodes Xf and Yf includes a transparent conductive film 41f and a metal film 42d and is arranged so that the neighboring electrodes of the neighboring rows are the same kind (e.g., in the order of X, Y, Y, X, X, Y, . . . ). The transparent conductive film 41f is patterned in the same way as the transparent conductive film 41b shown in FIG. 9A except for the size of the portion that is overlaid on the metal film 42d. The display electrodes Xf and Yf have a feature in that the metal film 42d as a bus conductor has a large width over two neighboring horizontal walls 292e. Since an element close to the display surface is drawn at the upper in the figure, a part of the metal film 42d is covered with the transparent conductive film 41f. However, actually in the observation from the display surface side, the metal film 42d can be seen through the transparent conductive film 41f. Namely, the entire metal film 42d works as a shading member for hiding the structure thereunder. Therefore, it is not necessary to provide another shading member (a black stripe) to the inter-row portion (the reverse slit), so that the manufacturing steps of a PDP can be reduced. In addition, since the width of the metal film 42d is enlarged, a line resistance of each of the display electrodes Xf and Yf decreases. Thus, the generation of Joule heat can be reduced, and the voltage drop is also reduced when the discharge current flows.

In FIG. 12, each of the display electrodes Xg and Yg includes a transparent conductive film 41g and a metal film 42e and three display electrodes are arranged for two rows so that a display electrode is shared by two neighboring rows for display (in the order of X, Y, X, Y, . . . ). The metal film 42e of the display electrodes Xg and Yg have a large width over three neighboring horizontal walls 292e. The example of FIG. 12 has the same advantage as the example of FIG. 11 in that the manufacturing steps can be reduced, and that the line resistance can be reduced.

In the above-mentioned embodiment, the dimension and the material of the partition 29 are not limited to the examples. The plan-view pattern of the partitions 29, 29b–29e is not limited to that enclosing a cell. It can be a mesh pattern enclosing plural cells as a unit.

According to the present invention, a PDP that has a good productivity of partition formation and air exhaustion process and can display more brightly and more stably than a PDP that has a stripe-patterned partition can be realized.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A plasma display panel having a display surface, comprising:

a pair of spaced substrates defining a gap therebetween;

a discharge gas filled in the gap between the substrates; and a mesh-patterned partition, disposed between respective inner surfaces of the substrates and extending over all of the display surface, dividing the gap into a cell arrangement of plural gas-filled cells, each cell having a surrounding partition sidewall, portions of the respective surrounding sidewall of the plural gas-filled cells [forming] *are lowered to form* mesh-like air paths extending through all of the plural gas-filled cells and to a periphery of the partition.

2. The plasma display panel according to claim 1, wherein [portions of the partition sidewalls are lowered to form the mesh-like air paths,] a difference between respective heights of the lowered portions and the other portions upper surface of the partition sidewalls is more than 5% of a maximum height of the partition.

3. The plasma display panel according to claim 1, wherein spaced, opposed portions of the respective sidewalls of the plural cells, aligned in row and column directions, are of a reduced height, relative to other portions of the respective sidewalls of the plural cells, thereby forming corresponding air paths.

4. The plasma display panel according to claim 1, wherein a fluorescent material is arranged on a row direction side and a column direction side of the respective partition sidewall of each of the cells.

5. The plasma display panel according to claim 1, wherein the cells in the row direction and in the column direction form a matrix display and an inter-row portion of the partition, that forms a boundary wall between adjacent rows, is of a lower height than other portions of the partition.

6. The plasma display panel according to claim 5, wherein the inter-row portion defines at least one space for each column.

7. The plasma display panel according to claim 6, wherein the inter-row portion has a ladder pattern.

8. The plasma display panel according to claim 5, wherein the partition is arranged on a back substrate, an electrode including a transparent conductive film and a metal film extending over all columns is arranged on the front substrate, and the metal film and the inter-row portion are overlaid.

9. The plasma display panel according to claim 1, wherein the partition is formed of a baked material having a heat shrink property, and a width of the reduced height portions of the partition sidewalls is greater than a width of the other portions of the sidewalls of the partition.

10. A method for manufacturing a plasma display having a display screen [accordingly claim 1] *having a pair of spaced substrates defining a gap therebetween, a discharge gas filled in the gap between the substrates, and a mesh-*

*patterned partition, disposed between respective inner surfaces of the substrates and extending over all of the display surface, dividing the gap into a cell arrangement of plural gas-filled cells, each cell having a surrounding partition sidewall, portions of the respective surrounding sidewall of the plural gas-filled cells are lowered to form mesh-like air paths extending through all of the plural gas-filled cells and to a periphery of the partition, said method* comprising:

forming a layer of a material having a heat shrink property on a substrate;

patterning the layer to define the mesh-patterned partition extending over all of the display screen and defining a cell arrangement of plural cells, each cell having a partition sidewall, portions of the respective surrounding sidewalls of the plural cells forming mesh-like air paths extending through all of the plural cells and to a periphery of the mesh-patterned partition; and forming the partition by baking the patterned layer.

11. The method according to claim 10, wherein the patterning further comprises placing a cutting mask corresponding to the cell arrangement on the layer, and cutting non-masked portions of the layer by sandblasting.

12. The plasma display panel according to claim 3, wherein portions of the partition sidewalls are lowered to form the mesh-like air paths, a difference between respective heights of the lowered portions and an upper surface of the partition sidewall being more than 10 μm.

13. The plasma display panel according to claim 3, wherein the air paths extend continuously over a complete length of each of the row and column directions.

14. A plasma display panel having a display surface, comprising:

a pair of substrates having parallel, spaced and opposed respective inner surfaces defining a gap therebetween;

a discharge gas filled in the gap between the substrates; and a mesh-patterned partition disposed between the respective inner surfaces of the substrates and dividing the gap into a cell arrangement of plural gas-filled cells in plural, transverse rows and columns covering the display surface and in which the partition defines a surrounding sidewall for each cell, [spaced and opposed] *at least* portions of the respective sidewalls of the plural cells, aligned in both the row and column directions, [defining] *are lowered in height to define* corresponding air paths in the row and column directions, that travel through all of the gas-filled cells to a periphery of the partition.

*15. A plasma display panel, comprising:*

*a pair of spaced substrates defining a gap therebetween;*

*a plurality of first walls dividing the gap into plural columns, each column comprising plural cells;*

*a plurality of second walls intersecting said first walls and dividing the gap into plural rows, each row comprising plural cells; and*

*at least portions of said first walls, in the intersections with said second walls, being of a lower height than a height of remaining portions of the first walls and defining flow paths extending through adjacent cells.*

*16. The plasma display panel recited in claim 15, wherein said flow path is defined by respective intersecting portions of the first and second walls, of lesser height than a height of remaining portions of the first wall.*

*17. The plasma display panel recited in claim 15, wherein at least one of said first and second walls has a zigzag pattern comprising a non-linear wall surrounding each associated cell.*

*18. A plasma display panel, comprising:*

*a pair of spaced substrates defining a gap therebetween;*

*a plurality of first walls dividing the gap into plural columns, each column comprising plural cells;*

*a plurality of second walls intersecting said first walls and dividing the gap into plural rows, each row comprising plural cells; and*

*the second walls having a width greater than 130% of a width of the first walls, at least portions of the intersections of the first and second walls being of a lower height than a height of remaining portions of the first walls and defining flow paths extending through adjacent cells.*

*19. The plasma display panel recited in claim 18, wherein said flow path is defined by respective intersecting portions of the first and second walls, of lesser height than a height of remaining portions of the first wall.*

*20. The plasma display panel recited in claim 18, wherein at least one of said first and second walls has a zigzag pattern comprising a non-linear wall surrounding each associated cell.*

*21. A plasma display panel, comprising:*

*a pair of spaced substrates defining a gap therebetween;*

*a discharge gas in the gap between the substrates;*

*a plurality of first walls dividing the gap into plural columns, each column comprising plural gas filled cells;*

*a plurality of second walls intersecting with said first walls and dividing the gap into plural rows, each row comprising plural gas filled cells; and*

*at least portions of said first walls, in the intersections with said second walls being of a lower height than a height of remaining portions of the first walls and defining flow paths extending through adjacent cells.*

*22. The plasma display panel recited in claim 21, wherein said flow path is defined by respective intersecting portions of the first and second walls, of lesser height than a height of remaining portions of the first wall.*

*23. The plasma display panel recited in claims 21, wherein at least one of said first and second walls has a zigzag pattern comprising a non-linear wall surrounding each associated gas filled cell.*

*24. A plasma display panel, comprising:*

*a pair of spaced substrates defining a gap therebetween;*

*a discharge gas filled in the gap between the substrates;*

*a plurality of first walls dividing the gap into plural columns, each column comprising of plural gas filled cells;*

*a plurality of second walls intersecting said first walls and dividing the gap into plural rows, each row comprising plural gas filled cells; and*

*the second walls having a width greater than 130% of a width of the first walls, at least portions of the intersections of the first and second walls being of a lower height than a height of remaining portions of the first walls and defining flow paths extending through adjacent gas filled cells.*

*25. The plasma display panel recited in claim 24, wherein said flow path is defined by respective intersecting portions of the first and second walls, of lesser height than a height of remaining portions of the first wall.*

*26. The plasma display panel recited in claims 24, wherein at least one of said first and second walls has a zigzag pattern comprising a non-linear wall surrounding each associated gas filled cell.*

*27. A plasma display panel having a display surface, comprising:*

*a pair of spaced substrates defining a gap therebetween;*

*a discharge gas filled in the gap between the substrates; and*

*a partition disposed between respective inner surfaces of the substrates and extending over all of the display surface, said partition comprising a plurality of first walls dividing the gap into rows of plural gas filled cells and a plurality of second walls intersecting with said first walls, dividing the gap into columns of plural gas filled cells,*

*wherein a portion of said first wall including at least a part of each intersection of said first and second walls is of a lower height than a portion of the second wall, thereby forming air paths extending through the adjacent gas filled cells and to a periphery of the partition.*

*28. A plasma display panel having a display surface, comprising:*

*a pair of spaced substrates defining a gap therebetween;*

*a discharge gas filled in the gap between the substrates;*

*a partition comprising a plurality of vertical walls and a plurality of horizontal walls, disposed between respective inner surfaces of the substrates and extending over all of the display surface, dividing the gap into a matrix arrangement of plural rows and columns of plural gas filled cells, said horizontal wall having a width more than 130% larger than a width of the vertical wall;*

*air paths extending between adjacent gas filled cells, through upper surface will portions of at least respective intersections of the vertical and horizontal walls, and to a periphery of the partition.*

*29. The plasma display panel recited in claim 28, wherein said air paths are provided in a pattern through reduced height upper surface wall portions on the horizontal walls, in crossing parts of the respective vertical and horizontal walls.*

*30. The plasma display panel recited in claim 28, wherein at least one of said vertical and horizontal walls has a zigzag pattern, surrounding each gas filled cell with a non linear sidewall.*

*31. The plasma display panel recited in claim 29, wherein at least one of said vertical and horizontal walls has a zigzag pattern, surrounding each gas filled cell with a non linear sidewall.*

*32. The plasma display panel recited in claim 28, wherein each of said horizontal walls includes at least one space at a portion corresponding to every column of the matrix arrangement of plural gas filled cells.*

*33. A plasma display panel, comprising:*

*a pair of front substrate and rear substrate having parallel, spaced and opposed respective inner surfaces defining a gas filled gap therebetween;*

*a plurality of display electrode pairs arranged on the inner surface of the front substrate in parallel relationship and extending in a horizontal direction;*

*a plurality of address electrodes arranged on the inner surface of the rear substrate in parallel relationship and extending in a vertical direction;*

*a mesh patterned partition disposed between the respective inner surfaces of the front and rear substrates and dividing the gas filled gap into a cell arrangement of plural discharge cells in plural, transverse rows and columns, said mesh patterned partition including a plurality of inter row portions, each thereof extending in a horizontal direction between respective, adjacent vertical walls defining corresponding rows of the discharge cell arrangement, each of said inter row portions comprises at least two horizontal walls, a width of each inter row portion being larger than a width of each vertical wall of said mesh patterned partition; and*

*an air paths extending between the adjacent discharge cells through corresponding portions above an upper surface of each of the horizontal walls of the inter row portions reduced in height by heat shrinking.*

*34. A plasma display panel recited in claim 33, wherein said air path is defined as a pattern of reduced height upper surface wall portions in respective crossing parts of the mesh patterned partition.*

*35. A plasma display panel recited in claim 33, wherein each said display electrode comprises a transparent conductive film and a metal film extending over all columns and arranged on the front substrate, the metal film and the inter row portion being overlaid.*

*36. A plasma display panel recited in claim 34, wherein each said display electrode comprises a transparent conductive film and a metal firm extending over all columns and is arranged on the front substrate, the metal film and the inter row portion being overlaid.*

*37. A method for manufacturing a plasma display panel having a display screen and a mesh patterned partition between a pair of opposed substrates, comprising:*

*forming a layer of material having a heat shrink property on one substrate;*

*patterning the layer to define the mesh patterned partition extending over all of the display screen and defining a matrix arrangement of plural cells in plural, transverse row and column directions, each cell surrounded with partition sidewalls, each of opposing sidewalls in a column direction having a width larger than the opposing sidewalls in a row direction; and*

*baking the patterned layer, thereby forming the partition so as to have a reduced height portion in each respective part of said opposing sidewall, extending in a row direction, of a larger width.*

* * * * *

UNITED STATES PATENT AND TRADEMARK OFFICE

CERTIFICATE OF CORRECTION

PATENT NO. : RE 40,502 E
APPLICATION NO. : 11/113337
DATED : September 16, 2008
INVENTOR(S) : Yasuhiko Kunii et al.

It is certified that error appears in the above-identified patent and that said Letters Patent is hereby corrected as shown below:

Column 12, Line 16, change “paths” to --path--.

Column 12, Line 37, before “material” insert --a--.

Signed and Sealed this

Third Day of March, 2009

JOHN DOLL
*Acting Director of the United States Patent and Trademark Office*